2,929,802
Patented Mar. 22, 1960

2,929,802

ELASTIC FILAMENTS OF LINEAR COPOLYURETHANES

Manfred Katz, Aberdeen, Md., assignor to E. I. du Pont de Nemours and Company, Wilmington, Del., a corporation of Delaware No Drawing. Application January 31, 1955
Serial No. 485,290

16 Claims. (Cl. 260—77.5)

This invention relates to new filamentary materials derived from polymers comprising urethanes linked to polyethers through urethane groups and especially to the elastic filaments obtained from certain of these compositions.

Attempts are constantly being made to improve filaments utilized in such applications as woven and nonwoven fabrics, felts, papers, and the like. For example, intense efforts have been made in recent years to improve the dyeability and wearing comfort of the synthetic fibers. There is a particular need in textile and allied fields for synthetic filaments to replace rubber, which, in textile applications, has a number of disadvantages which tend to offset its desirable elastic properties. It would be particularly desirable to have available new filaments which are highly elastic and have a higher modulus and are more abrasion resistant than rubber, but which do not possess its undesirable characteristics.

An object of this invention, therefore, is to provide new synthetic filaments which would be useful in fabrics, papers, felts, and similar applications. Another object is to provide synthetic filaments which possess high elastic recovery and are prepared from polymers with a high polymer melt temperature and a low second order transition temperature. Further objects are to provide filaments which can be readily fabricated from the polymeric materials and to provide a simple, rapid method for preparing these polymers. These and other objects will be evident from the following discussion.

The objects of this invention are accomplished by utilizing a rapid, smooth polymerization technique which produces a linear polymer of the desired chemical composition and physical characteristics. As will be seen the polymer is a polyurethane made by effecting condensation reactions between monomeric diamines, a polyether bishaloformate derived from a polyether glycol and a bishaloformate derived from a low molecular weight glycol. The techniques that can be used are solution and interfacial polymerizations. The physical make-up of the polymer is such that the polymer has a high melt temperature and a low second order transition temperature. This is the first time a polyurethane having these characteristics has been prepared. Physically, the polymer is composed of at least two segments: one segment which is crystalline and represents one or more repeating units of a polymer which melts above 175° C. in the fiber-forming molecular weight range (about 5000 or higher) and the second segment, chemically bonded to the first, which is also polymeric in nature but has a melting point below about 50° C. This latter segment is derived from a polyether glycol and the high melting segment is derived from a diamine and a glycol. The presence of these segments is shown graphically in the X-ray diffraction patterns and studies of the polymers of this invention. The polyether glycol can be readily selected from a large list of known polyethers having known melting points, and the melting points and crystalline characteristics of urethane polymers prepared from the diamines and glycol, generally through bischloroformate, are well known or readily determined. It is not necessary to start with such urethane polymers and, in fact, the monomers are generally used, these monomers and, generally, the bischloroformate of the polyether glycol being condensed in any desired sequence. Since the final products contain a polymeric section derived from the polyether glycol and a polyurethane, they are copolyurethanes. The amounts of the components are regulated and the elastomers which result are very readily shaped into elastic filaments.

In general, the filaments of this invention have an essentially linear structure and are prepared from a segmented copolyurethane consisting essentially of a multiplicity of urethane segments containing at least one repeating unit of a fiber-forming polyurethane. The repeating unit has the formula

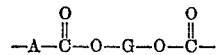

wherein —A— is a bivalent organic radical containing terminal nitrogen atoms, to each of which nitrogen atoms is attached one of the indicated free valences of the radical —A—. In the formula —G— is the residue remaining after removal of the hydroxyl groups from a glycol having a molecular weight below 400. The polyurethane has a melting point above about 175° C. in the fiber-forming molecular weight range. At least some of the urethane segments are connected by urethane linkages of the formula

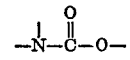

wherein

is one of the terminal nitrogens of the aforementioned radical —A—, to polyether residues which are the radicals remaining after removal of the terminal hydroxyl groups of a polyether glycol consisting essentially of divalent hydrocarbon groups joined by ether-oxygen atoms. The polyether glycol has a melting point below about 50° C. and a molecular weight above about 400. The urethane segments constitute from about 10% to about 40% by weight of the copolyurethane.

Thus, the filaments of this invention are prepared from polymers comprising (1) a urethane unit or segment prepared from at least two complementary monomers capable of forming a polymer with a polymer melt temperature above 175° C., preferably above 200° C., in the fiber-forming molecular weight range linked through urethane groups to (2) a polyether having a molecular weight above about 400 (preferably betwen about 800 and about 5000) and having a melting point below about 50° C. If there is only one urethane unit separating the polyethers, this unit should be of a polymer melting above 250° C. The filament-forming polymers of this invention are prepared by reacting (1) a composition comprising at least two complementary monomers including a low molecular weight bischloroformate and a diamine capable of forming a fiber-forming polyurethane or a copolyurethane with (2) a bischloroformate of a polyether glycol. Thus the final products are copolyurethanes in which one of the components is a polyether. Similar polymer derived from the reaction of polyether glycols, diisocyanates, and low molecular weight glycols by a melt polymerization process are not as satisfactory for filament preparation because of the tendency to cross-link and form gels before a linear polymer of sufficiently high molecular weight suitable for filament formation has been obtained. Usually, the polymers formed by the monomers mentioned in composition (1) would be homopolymers, but many monomers leading to copolymers are suitable. Component (2) is usually a homopolymer but frequently it is desirable to use a copolymer to modify the melting or solubility or other characteristics.

Compositions which contain about 10 to about 40% by weight of the high melting segment or, conversely, about 60% to about 90% of the segment derived from the polyether glycol will be elastomers. The processes described herein can be used for making polymers outside this range but the filaments therefrom, although useful, are not preferred since they are not elastic. It has been found that the best elastomers are produced when the difunctional macro-molecule, i.e. the polyether glycol or its urethane-forming derivative, forms a segment which is substantially amorphous at room temperatures. Elastomers having polymer melt temperatures above 150° C. are preferred for filament formation.

The elastic compositions of this invention show high elastic recovery (above 90%), low stress decay (below 20%), and frequently have a higher modulus than rubber, which is the nearest known equivalent in terms of elastic properties. Elastic recovery is the percentage return to original length within one minute after the tension has been released from a sample which has been elongated 50% at the rate of 100% per minute and held at 50% elongation for one minute. Stress decay is the percent loss in stress in a yarn one minute after it has been elongated to 50% at the rate of 100% per minute.

The high melting component is a polyurethane, but, as has been indicated previously, it is not essential that it be a homopolymer. Polymer compositions containing a majority of polyurethane linkages which have polymer melt temperatures above 175° C. when polymerized to the fiber-forming molecular weight range are satisfactory. If the high melting component is a copolymer, it may be a copolyurethane or it may contain polyamide, polyurea, or polysulfonamide linkages. In most instances, the homopolymers are preferred.

The polyether glycol may be a homopolymer or a copolymer. The essential features are that it be difunctional and have a melting point below about 50° C. The polyethers are primarily poly(alkylene oxide) glycols but some of the oxygens may be replaced with sulfur atoms and some of the alkyl groups may be replaced with aryl or cycloaliphatic radicals. Even where the linkages are the same the compositions may be copolymers, such as a copolyether derived from more than one glycol. Copolymers are particularly useful when one of the macromolecular homopolymers melts so high that it is difficult to use in the process of this invention. Copolymer formation can then be used to lower the melting point and also reduce or minimize undesirable crystallization in this segment of the final copolymer. However, polymers prepared in accordance with this invention are essentially equivalent in filament-forming and in elastic properties, while polymers prepared outside the melting point or molecular weight limitations of this invention will differ in such properties.

The scope of the invention is readily understood by referring to the following examples, which are given for illustrative purposes only and should not be considered to represent the limits of the invention.

*Example I*

Hexamethylene diamine (3.19 grams) (0.0275 mol), sodium carbonate (5.84 grams) (0.055 mol), and one gram of "Duponol" ME (sodium salt of lauryl alcohol sulfate produced by du Pont under this trademark) were dissolved in 64 ml. of water in a Blendor. To this was added with vigorous stirring a solution of 5.0 grams (0.0025 mol) of the bischloroformate prepared from poly(propylene oxide) glycol having a molecular weight of 2000 and 4.67 grams (0.025 mol) of ethylene bischloroformate in 20 ml. of benzene. A granular polymer with a polymer melt temperature of 182° C. and an inherent viscosity in m-cresol of 0.51 was obtained in 82% yield. The polymer was soluble in m-cresol and sulfuric acid.

*Example II*

An aqueous solution was prepared by adding the following ingredients to an ice-jacketed Blendor: 210 ml. of water, 10.6 grams of sodium carbonate, 2 grams of "Duponol" ME, and 4.5 grams of piperazine. To this was added with vigorous stirring a solution of 9.4 grams of ethylene bischloroformate and 8.0 grams of the bischloroformate of poly(ethylene oxide) glycol (molecular weight of 4000) in 30 ml. of benzene. A polymer with an inherent viscosity in m-cresol of 1.92 and a polymer melt temperature of 230° C. was obtained. This polymer contained approximately 55% by weight of urethane units derived from the reaction of piperazine with ethylene bischloroformate and 45% by weight of urethane units derived from the reaction of poly(ethylene oxide) bischloroformate with piperazine. The polymer could readily be shaped into useful filaments.

*Example III*

The following ingredients were placed in a Blendor: 175 ml. of water, 10.6 grams (0.10 mol) of sodium carbonate, 2.0 grams of "Duponol" WA (substantially equivalent to "Duponol" ME), 1.43 grams (0.024 mol) of ethylene diamine and 10 ml. of chloroform. To this was added with vigorous stirring a mixture of 4.3 grams (0.023 mol) of ethylene bischloroformate dissolved in 15 ml. of chloroform and 4.0 grams (0.001 mol) of the bischloroformate of poly(ethylene oxide) glycol (molecular weight of 4000) dissolved in 10 ml. of benzene. The polymer was filtered, washed with hot water, and dried. The dried product had an inherent viscosity in m-cresol of 1.90 and a polymer melt temperature of 220° C. The polymer contained 67% by weight of urethane units derived from the reaction of ethylene diamine with ethylene bischloroformate and 33% by weight of urethane units derived from the reaction of poly(ethylene oxide) bischloroformate with ethylene diamine. Useful filaments could be prepared from this polymer.

*Example IV*

The following ingredients were placed in a Blendor at room temperature: 140 ml. of water, 12 grams (0.113 mol) of sodium carbonate, 30 ml. of a 6.5% solution of "Duponol" WA, 3.50 grams (0.0585 mol) of ethylene diamine, and 10 ml. of benzene. To this was added with vigorous stirring a solution of 10 grams (0.0535 mol) of ethylene bischloroformate and 20 grams (0.005 mol) of the bischloroformate of poly(ethylene oxide) glycol (molecular weight of 4000) in 15 ml. of benzene. The polymer was filtered, washed with hot water and dried. The dried product had an inherent viscosity in m-cresol of 1.32. The polymer contained 35% by weight of urethane units derived from the reaction of ethylene diamine with ethylene bischloroformate and 65% by weight of urethane units derived from reaction of ethylene diamine with the bischloroformate of poly(ethylene oxide) glycol. The polymer could be used to prepare elastic filaments.

*Example V*

The following ingredients were added to an ice-jacketed Blendor: 130 ml. of water, 10.5 grams (0.10 mol) of sodium carbonate, 40 ml. of a 5% solution of "Duponol" ME, 3.83 grams (0.033 mol) of hexamethylene diamine, and 15 ml. of benzene. To this was added with vigorous stirring 6.0 grams (0.032 mol) of ethylene bischloroformate and 4.2 grams (0.001 mol) of the bischloroformate of poly(ethylene oxide) glycol (molecular weight of 4000) in 10 ml. of benzene. The polymer was filtered, washed with hot water, and dried. The dried product had an inherent viscosity in m-cresol of 1.43 and a polymer melt temperature of 176° C. This polymer contained approximately 67% by weight of urethane units derived from the reaction of hexamethylene diamine with ethylene bischloroformate and 33% by weight of urethane units derived from the reaction of hexamethylene diamine with the bischloroformate of poly(ethylene oxide) glycol. Useful filaments of this invention were readily produced by dry spinning procedures.

*Example VI*

The following ingredients were added to a Blendor at room temperature: 140 ml. of water, 10.6 grams (0.10 mol) of sodium carbonate, 35 ml. of a 6.5% "Duponol" WA solution, 3.1 grams (0.0518 mol) of ethylene diamine, and 10 ml. of chloroform. To this was added with vigorous stirring a solution of 8.0 grams (0.0438 mol) of ethylene bischloroformate and 8.0 grams (0.008 mol) of the bischloroformate of poly(ethylene oxide) glycol (molecular weight of 1000) in 15 ml. of chloroform. The polymer was filtered, washed with hot water, and dried. The dried product had an inherent viscosity in m-cresol of 1.22 and a polymer melt temperature of 195° C. This polymer contained approximately 39% by weight of urethane units derived from the reaction of ethylene diamine with ethylene bischloroformate and 61% by weight of urethane units derived from the reaction of ethylene diamine with the bischloroformate of poly(ethylene oxide) glycol. Either wet or dry spinning techniques could be used to form filaments from the polymer.

*Example VII*

The bischloroformate (6 grams) (0.0015 mol) of poly(ethylene oxide) glycol with a molecular weight of 4000 and 4.3 grams (0.023 mol) of ethylene bischloroformate were dissolved in 100 ml. of benzene and charged to a Blendor at room temperature. To this was added with vigorous stirring 2.84 grams (0.0245 mol) of hexamethylene diamine dissolved in 17 ml. (0.051 mol) of 3 N sodium hydroxide solution. After 5 minutes of stirring the polymer was filtered, washed with a 50/50 mixture of acetone and water, and dried in a 60° C. oven under reduced pressure. The dried polymer had an inherent viscosity in m-cresol of 1.0 and a polymer melt temperature of 165° C. This polymer, which could be easily shaped into filaments, contained approximately 53% by weight of urethane units derived from the reaction of hexamethylene diamine with ethylene bischloroformate and approximately 47% by weight of urethane units derived from the reaction of hexamethylene diamine with the bischloroformate of poly(ethylene oxide) glycol.

*Example VIII*

The bischloroformate (6 grams) (0.00177 mol) of poly(tetramethylene oxide) glycol with a molecular weight of 3600 and 2.92 grams (0.0156 mol) of ethylene bischloroformate were dissolved in 135 ml. of benzene and placed in a Blendor. To this was added with vigorous stirring a solution of 1.52 grams (0.0173 mol) of piperazine in 23 ml. (0.051 mol) of 2.2 N sodium hydroxide. After the reaction mixture had been stirred for five minutes, the benzene was removed by evaporation. The polymer was filtered off and dried. It had an inherent viscosity in m-cresol of 1.59 and a polymer melt temperature of 160° C. The polymer contained approximately 22% by weight of urethane units derived from the reaction of piperazine with ethylene bischloroformate and approximately 78% by weight of urethane units derived from the reaction of piperazine with the bischloroformate of poly(tetramethylene oxide) glycol. Filaments dry spun from an 88/12 chloroform/methanol solution had the following properties: tenacity=0.32 g.p.d., elongation=587%, stress decay=11.5%, and tensile recovery=92%.

*Example IX*

A solution of 5.5 grams (0.0228 mol) of the bischloroformate of cyclohexanediol and 6.0 grams (0.0017 mol) of the bischloroformate of poly(tetramethylene oxide) glycol with a molecular weight of 3600 in 125 ml. of benzene was placed in a Blendor. To this was added with vigorous stirring a solution of 2.11 grams (0.0245 mol) of piperazine in 23 ml. (0.05 mol) of 2.2 N sodium hydroxide. After five minutes of stirring 200 ml. of water was added and the mixture placed in a steam bath. After some benzene had evaporated, 200 ml. of acetone was added and heating continued until the polymer precipitated. This was isolated, washed three times with water and dried in a vacuum oven at 60° C. A practically quantitative yield of a polymer with an inherent viscosity in m-cresol of 1.19 and a polymer melt temperature of 247° C. was obtained. This polymer contained approximately 48% by weight of urethane units derived from the reaction of piperazine and the bischloroformate of cyclohexanediol and 52% by weight of urethane units derived from the reaction of piperazine with the bischloroformate of poly(tetramethylene oxide) glycol. Flexible, useful filaments having high elongations could be made from the polymer.

*Example X*

The bischloroformate (8 grams) (0.0022 mol) of poly(tetramethylene oxide) glycol with a molecular weight of 3600 and 6.0 grams (0.0248 mol) of the bischloroformate of cyclohexanediol were dissolved in 120 ml. of benzene and the solution placed in a Blendor at room temperature. To this was added with vigorous stirring 2.15 grams (0.025 mol) of piperazine dissolved in an aqueous medium comprising 23 ml. (0.05 mol) of 2.2 N sodium hydroxide. After five minutes stirring at room temperature 300 ml. of acetone and 200 ml. of water were added and the mixture placed in a steam bath. Evaporation of solvent was continued until the polymer precipitated. The polymer was filtered, washed twice with hot water, and dried in a vacuum oven at 65° C. A practically quantitative yield of a polymer with an inherent viscosity in m-cresol of 1.26 and a polymer melt temperature of 190° C. was obtained. This polymer, from which elastic filaments could be made, contained approximately 43% by weight of urethane units derived from the reaction of piperazine with the bischloroformate of cyclohexanediol and approximately 57% by weight of urethane units derived from the reaction of piperazine with the bischloroformate of poly(tetramethylene oxide) glycol.

*Example XI*

The following ingredients were added to a Blendor: 175 ml. of water, 50.5 grams (0.15 mol) of sodium carbonate, 2.0 grams of "Duponol" WA, 5.5 ml. (0.08 mol) ethylene diamine, and 10 ml. of chloroform. The following ingredients were added to this emulsion with vigorous stirring: 10 grams of the bischloroformate of poly(ethylene oxide) glycol with a molecular weight of 400, 9.6 grams (6.5 ml.=0.05 mol) of ethylene bischloroformate and 15 ml. of chloroform. After several minutes reaction at room temperature the polymer was filtered, washed with hot water, and dried. A polymer (13.5 grams) with an inherent viscosity of 1.04 and a polymer melt temperature of 180° C. was obtained.

The polymer was melt spun at 182° C. The as-spun filaments were relaxed in boiling water to give filaments with the following properties: tenacity=0.16 g.p.d., elongation=250%, initial modulus=0.3 g.p.d., stress decay=13%, and tensile recovery=93%. Since degradation of the polymer is appreciable at 200° C., some slight degradation of the polymer may have occurred while spinning at 182° C. Better filament properties are obtainable by dry spinning. Conventional dry or wet spinning techniques avoid chemical and physical changes in the polymer during the shaping step. Therefore, these procedures are preferred.

The expression "polymer melt temperature," as used here, is the minimum temperature at which a sample of the polymer leaves a wet, molten trail as it is stroked with moderate pressure across a smooth surface of a heated brass block. "Polymer melt temperature" has sometimes in the past been referred to as "polymer stick temperature." "Initial modulus" is determined by measuring the initial slope of the stress/strain curve.

The diamines used to prepare these polymers may be any primary or secondary aliphatic, alicyclic, heterocyclic, or aromatic diamine. As representative examples may be mentioned: ethylene diamine, propylene diamine, tetramethylene diamine, pentamethylene diamine, hexamethylene diamine, heptamethylene diamine, octamethylene diamine, piperazine, 2,5-dimethylpiperazine, p-xylylene diamine, 1,4-diaminocyclohexane, p-phenylene diamine, 1-methyl-2,4-diaminobenzene, bis(p-aminocyclohexyl) methane, and many others. Mixtures of diamines may be used as well. Derivatives of the diamines listed may also be used as long as the substituents do not interfere with the polymerization. For example, the aliphatic diamines may have hydrocarbon side chains or be substituted with halogens or nitro groups which are inert under the conditions used herein.

The bishaloformates of the glycols or of the polyether glycols may be the chloro-, bromo-, iodo- or fluoroformates, but usually the bischloroformates will be employed since they are readily available or prepared using phosgene.

The bischloroformates required to react with the diamines to form polyurethanes can be prepared from any glycol or organic dihydroxy compound. This includes aliphatic, aromatic, mixed aliphatic-aromatic, cycloaliphatic, and difunctional hydroxy compounds containing heterocyclic rings. As specific examples may be mentioned the bischloroformates of ethylene glycol, propylene glycol, pentaglycol, butylene glycol, o-, m-, and p-xylylene glycol, cyclohexanediol, hydroquinone, 2,5-dihydroxydioxane, resorcinol, catechol, 4-methyl resorcinol, etc. As was the case with the diamines, mixtures of these bischloroformates may be used or they may be substituted with groups which do not interfere.

Diacid halides may be included in the compositions in minor amounts to form amide linkages. The diacid halides of aliphatic, aromatic, mixed aliphatic-aromatic, and alicyclic acids and acids containing heterocyclic rings may be used. As specific examples may be mentioned the acid halides of succinic, adipic, suberic, sebacic, terephthalic, hexahydroterephthalic, isophthalic, phthalic, bibenzoic, 1,5-naphthalene dicarboxylic acid, piperazine diacetic acid, m-benzenedisulfonic acid, and 1,5-naphthalenedisulfonic acid.

Representative difunctional polyethers which may be used include the polyoxathioalkylene glycols, such as poly(1-oxa-4-thiahexane), poly(1,4-dioxa-7-thianonane), and poly(1,6-dioxa-9-thiahendecane); the poly(alkylene oxide) glycols, such as poly(ethylene oxide) glycol, poly(propylene oxide) glycol, poly(tetramethylene oxide) glycol, and poly(decamethylene oxide) glycol; polydioxolane, and polyformals prepared by reacting formaldehyde with other glycols or mixtures of glycols, such as tetramethylene glycol and pentamethylene glycol. Some of the alkylene radicals in these polyethers may be replaced with arylene or cycloaliphatic radicals.

The preferred macrointermediates are the bischloroformates of the poly(alkylene oxide) glycols. The preferred macrointermediate of this type is the bischloroformate of poly(tetramethylene oxide) glycol. Copolymers formed with piperazine or hexamethylenediamine and ethylene bischloroformate are particularly useful.

These copolymers may be prepared by: (1) interfacial polymerization or (2) solution polymerization.

Interfacial polymerization has rapidly been attaining increased importance in the polymer field. It is a rapid, moderate temperature reaction in which the reactants are brought together in such a way that the reaction zone is at, or is immediately adjacent to, a liquid-liquid interface. Thus, most of the molecules of at least one of the reactants must diffuse through liquid diluent to arrive at the reaction zone. The reactants in one liquid phase may be one or more of the diamines, and the reactants in the other liquid phase may be one or more of the bischloroformates. The two liquid phases are mixed to form a two-phase system in which the diamine and the bischloroformate are in separate phases, at least one of which includes a liquid diluent. Preferably, a reactant is a liquid under the reaction conditions or is dissolved in a diluent, but one of the reactants may be dispersed or suspended as a finely divided solid in a diluent which will dissolve it, at least partially. The phases are mixed until the desired condensation polymerization has taken place, and then, if desired, the polyurethanes obtained are isolated.

Polyurethanes can be prepared by dissolving bischloroformates and diamines in separate portions of the same solvent, which is inert to the reactants, and then mixing these solutions in the presence of a suitable acid acceptor to form high molecular weight polyurethanes. The molecular weight of the polymers is controlled by the choice of the solvent medium or by the use of mixtures of appropriate solvents.

For optimum results the copolyurethanes of this invention should have an inherent viscosity of the order of 1.0–3.0 or above, although copolymers having inherent viscosities as low as 0.5 are useful. Polymers in the lower molecular weight range are useful in certain applications, such as the preparation of molded objects. However, the ones of particular interest are those with molecular weights in the fiber-forming range, i.e., above about 5,000. Inherent viscosity is defined as:

$$\frac{\ln \eta_r}{C}$$

in which $\eta_r$ is the viscosity of a dilute solution of the polymer divided by the viscosity of the solvent in the same units and at the same temperature, and $C$ is the concentration in grams of the polymer per hundred ml. of solution. The inherent viscosities recorded here were measured in m-cresol. In most cases a concentration of 0.5 gram per hundred ml. of solution was used.

This invention represents an important development in that it demonstrates for the first time a method for preparing polymers which have both a high polymer melt temperature and a low second order or glass transition temperature. In the prior art, a number of rubbery polymers with relatively low second order transition temperatures have been prepared. These polymers have invariably had low polymer melt temperatures and tended to creep on extension. Therefore, it has usually been necessary to cross-link them in order to obtain good elastic properties. These limitations have restricted their usefulness. For example, the insolubility and infusibility of the cross-linked products makes subsequent processing difficult. Polymers with high polymer melt temperatures also have had in the past high second order transition temperatures; this means that they tend to be nonelastic at room temperatures. The transition temperature can be lowered and the room temperature elasticity correspondingly increased through copolymer formation. However, this has invariably led to a large drop in the polymer melt temperature.

The elastic polymers of this invention are unique in that they are linear polymers with properties equivalent to those of the cured, cross-linked elastic products now available. This has been accomplished by substituting crystalline, high-melting components for the chemical cross-links of cured elastomers, such as rubber. The absence of cross-links results in improved solubility. The practical end result is that these polymers can be dissolved in fairly common solvents which can be used to prepare solutions which are readily adapted to the preparation of filaments.

These filaments are useful in such applications as fabrics, rope, papers, felts, and similar articles. The filaments prepared from the elastic copolyurethanes are a particularly desirable feature in this invention. The best compositions of this invention exhibit stress decay properties nearly equivalent to those of rubber. The higher tenacity, higher initial modulus, better abrasion resistance, and more easily controlled elongation of these polymers fit them for many applications for which rubber is undesirable or ineffective. Most of these filaments possess the important additional advantage that they are easily fabricated. A large percentage of the rubber threads used are prepared by slitting rubber sheets. This produces relatively large denier filaments, which cannot be converted readily into multifilaments and are not acceptable for many uses, particularly in certain fabrics. Finer denier monofilaments and multifilaments can be prepared by extruding and coagulating rubber dispersions, but this process has proved to be expensive and the product is frequently unsatisfactory. Both types of rubber filaments have poor abrasion resistance. These disadvantages are entirely avoided by the processes and products of this invention.

Some of the copolyurethanes of this invention also possess the desirable characteristic of being hydrophilic. The ability to absorb more moisture is desirable for a textile fiber, because the fabrics made from them are more comfortable to wear. The low moisture absorption of many of the hydrophobic fibers now available is undesirable in many applications.

Although these copolyurethanes possess many desirable properties, it is sometimes necessary to stabilize certain of the compositions to heat or radiation by ultra-violet light. Fortunately, this can be done very readily by incorporating stabilizers. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valence state. An extensive list of suitable stabilizers is given in copending application, Shivers, Serial Number 329,114, filed December 31, 1952.

Filaments can be prepared by melt, dry or wet spinning procedures. In melt spinning, care should be taken to avoid thermal degradation. In shaping filaments using solutions, solvents which have been found satisfactory for preparing solutions of suitable concentration are N,N-dimethylformamide, N,N-dimethylacetamide, tetramethylene cyclic sulfone, formic acid, and 60/40 trichloroethane/formic acid mixtures.

Conventional conditions are used for dry spinning, except that the elastic filaments usually have to be talced or lubricated, usually with water, because they tend to be somewhat tacky immediately after extrusion. Spinning speeds are usually somewhat lower than those used in some commercial processes for textile filaments, but speeds in excess of 300 yards per minute have been attained with the elastic filaments of this invention. This is considered excellent for filaments of this type.

When wet spinning, the spinning speeds are usually lower, but this procedure has a definite advantage when larger denier filaments are being prepared. A preferred solvent for wet spinning is N,N-dimethylformamide. The polymer solutions in this solvent are generally extruded into a hot water bath.

It is possible to prepare stable dispersions of certain polymers of this invention, including the elastomeric ones, and shaped articles can be prepared by extruding, coagulating and coalescing the polymer particles. In some instances heat coalescence will be satisfactory but for others a solvent will have to be used to promote coalescence. Shaping and polymerization can also be combined into a single step.

Cold drawing is not essential for producing filaments with desirable properties, particularly in the case of the elastic filaments. However, the overall properties of many of these filaments are improved by cold drawing operations which result in increased orientation and crystallinity in the final structure. Therefore, prior to final packaging, the yarns may be drawn at a suitable draw ratio, such as 2 to 10×, for the particular copolymer, and relaxed, to give a product with a desired combination of tenacity, initial modulus, yarn elongation, elasticity, and similar properties.

The elastic polymer yarns of this invention are characterized by higher strength and stretch modulus and substantially better abrasion resistance than any rubber threads known. For example, the filaments of this invention have an abrasion resistance about 30 times that of rubber. Stretch modulus measures the force required to elongate the yarn a given percentage. A garment of yarns having high tenacity and high stretch modulus will not only be durable but will also exert substantial pressure on the body of the wearer after the garment is stretched into position as desired, for example, in surgical stocking. Yarns of this invention have many advantages over rubber threads. For example, they may be spun readily into multifilament yarns and into low denier filaments. They have a very low inherent color, superior abrasion resistance, may be dyed by common dyestuffs, need no plasticizers which might later be leached out of the yarn, and have a good resistance to perspiration or greases and many other common chemicals. Furthermore, these elastic yarns are capable of very quick elastic recovery, a property which is lacking in many of the so-called elastic fibers.

The elastic properties attained by this invention result in part from the novel combination of a segment of a "hard" or high melting polymer with a "soft" or low melting polymeric segment. The polymers from which the former segments are derived all melt at temperatures of at least 175° C., as exemplified as follows: Polyurethane from hexamethylene diamine and ethylene bis(chloroformate), 175° C.; polyurethane from ethylene diamine and ethylene bis(chloroformate), 220° C.; polyurethane from piperazine and ethylene bis(chloroformate), 245° C.; and polyurethane from piperazine and the bis(chloroformate) of cyclohexanediol, 275° C. The melting points of the polyether glycols are below about 50° C., as, for example, poly(ethylene oxide) glycol of 1,000 molecular weight and poly(propylene oxide) of 2000 molecular weight which are liquids at room temperature; poly(tetramethylene oxide) glycol having an average molecular weight of 1000, about 20° C., of 1500 molecular weight, about 30° C., and 3000 molecular weight, about 40° C. The melting points of the polyether glycols are generally not sharp and may vary for a given molecular weight. Thus, some samples of the higher molecular weight polyether glycols may have apparent melting points as high as 55° C. The "hard" segments may be combined with the low melting segments to produce a large number of elastomers of this invention.

It will be apparent that many widely different embodiments of this invention may be made without departing from the spirit and scope thereof, and therefore it is not intended to be limited except as indicated in the appended claims.

I claim:

1. A filament having an elastic recovery above about 90%, a stress decay below about 20%, and an essentially linear structure of a segmented copolyurethane having a polymer melt temperature above 150° C. and an inherent viscosity of at least 1 as measured in a solution of m-cresol having a concentration of 0.5 gram per 100 ml. of solution, said copolyurethane consisting essentially of a multiplicity of urethane segments containing at least one repeating unit of a fiber-forming polyurethane, said repeating unit being of the formula

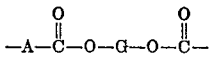

wherein —A— is a bivalent organic radical containing terminal nitrogen atoms, to each of which nitrogen atoms is attached one of the indicated free valences of the said radical —A—, and wherein —G— is the residue remaining after removal of the hydroxyl groups from a glycol having a molecular weight below 400, the said polyurethane having a melting point above about 175° C. in the fiber-forming molecular weight range, at least some of said urethane segments being connected by urethane linkages of the formula

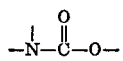

wherein

is one of the terminal nitrogen atoms of the aforementioned radical —A—, to polyether residues which are the radicals remaining after removal of the terminal hydroxyl groups of a polyether glycol consisting essentially of divalent hydrocarbon groups joined by intralinear ether-oxygen atoms, said polyether glycol having a melting point below about 50° C. and a molecular weight above about 400, said urethane segments constituting from about 10% to about 40% by weight of said copolyurethane.

2. A filament of a linear segmented polymer having an elastic recovery above about 90%, a stress decay below about 20%, and an essentially linear polymeric structure, said segmented polymer having a polymer melt temperature above 150° C. and an inherent viscosity of at least 1 as measured in a solution of m-cresol having a concentration of 0.5 gram per 100 ml. of solution, said polymer consisting of segments of a crystalline urethane polymer chemically connected through urethane linkages to polyether segments, said urethane segments containing at least one repeating unit of a urethane polymer prepared from an organic diamine and a bishaloformate of a glycol having a molecular weight below 400 capable of forming with said diamine a linear crystalline urethane polymer having a melting point above about 175° C. in the molecular weight range above 5000, said polyether segments being the residues remaining after removal of the terminal hydroxyl groups of a difunctional hydroxyl-terminated polyether having a melting point below about 50° C. and a molecular weight above about 400, said difunctional hydroxyl-terminated polyether being selected from the group consisting of poly(alkylene oxide) glycols, poly(alkylene arylene oxide) glycols, poly(alkylene cycloalkylene oxide) glycols, poly(oxathialkylene) glycols, and polydioxolane, said urethane segments being present in an amount from about 10% to about 40% by weight of the segmented polymer.

3. The process of preparing linear fiber-forming segmented copolymers having urethane segments chemically connected through urethane linkages to copolyether segments, said polymers being capable of being spun into filaments having an elastic recovery above about 90% and a stress decay below about 20% which consists of reacting a mixture of a bishaloformate of a polyether glycol having a melting point below about 50% C. and a molecular weight above about 400 and a bishaloformate of a low molecular weight glycol having a molecular weight below 400 with an essentially stoichiometric amount of an organic diamine, said organic diamine and said bishaloformate of a low molecular weight glycol being capable of forming a linear crystalline urethane polymer having a melting point above about 175° C. in the molecular weight range above 5000, said bishaloformate of the low molecular weight glycol being present in a ratio with said bishaloformate of the polyether glycol such that about 10% to about 40% of said urethane segments are present in said segmented copolymers.

4. A process in accordance with claim 3 wherein the polyether glycol bishaloformates are bischoloroformates.

5. A process in accordance with claim 3 wherein the molecular weight of said polyether glycol is between about 800 and about 5000.

6. A process in accordance with claim 3 wherein the said fiber-forming segmented copolymers have an inherent viscosity between about 1 and about 3, as determined in a solution of m-cresol having a concentration of 0.5 gram per 100 ml. of solution.

7. A process in accordance with claim 3 wherein said polyether glycol is a poly(alkylene oxide) glycol.

8. A process in accordance with claim 7 wherein said poly(alkylene oxide) glycol is poly(tetramethylene oxide) glycol.

9. A process in accordance with claim 3 wherein said diamine is an aliphatic diamine.

10. A process in accordance with claim 9 wherein said diamine is ethylene diamine.

11. A process in accordance with claim 3 wherein said diamine is a heterocyclic diamine.

12. A process in accordance with claim 11 wherein said diamine is a piperazine.

13. A process in accordance with claim 3 wherein said bishaloformate of a low molecular weight glycol is the bishaloformate of an aliphatic glycol.

14. A filament in accordance with claim 1 wherein said polyether glycol is poly(tetramethylene oxide) glycol.

15. The filament of claim 1 in which a minor proportion of amide linkages are present in the said urethane segments.

16. A process in accordance with claim 2 wherein said mixture of bishaloformates also contains a minor proportion of a diacid halide.

References Cited in the file of this patent

UNITED STATES PATENTS

| 2,660,575 | Jones | Nov. 24, 1953 |
| 2,692,873 | Langerak | Oct. 26, 1954 |
| 2,835,654 | Carter et al. | May 20, 1958 |

FOREIGN PATENTS

| 18,733 | Union of South Africa | Feb. 1, 1954 |
| 52,968 | France | July 17, 1944 |
| 519,014 | Belgium | Oct. 5, 1953 |
| 892,361 | France | Jan. 7, 1944 |
| 1,074,451 | France | Mar. 31, 1954 |

OTHER REFERENCES

Heiss et al.: Ind. & Eng. Chem., vol. 46, #7, July 1954, pages 1498–1501.

UNITED STATES PATENT OFFICE
CERTIFICATE OF CORRECTION

Patent No. 2,929,802                      March 22, 1960

Manfred Katz

It is hereby certified that error appears in the printed specification of the above numbered patent requiring correction and that the said Letters Patent should read as corrected below.

Column 11, line 56, for "poly(oxathialkylene)" read -- poly (oxathiaalkylene) --; column 12, lines 14 and 15, for "the polyether glycol" read -- said --; line 45, for the claim reference numeral "2" read -- 3 --.

Signed and sealed this 27th day of September 1960.

(SEAL)
Attest:

KARL H. AXLINE
Attesting Officer

ROBERT C. WATSON
Commissioner of Patents